US008553569B2

(12) United States Patent
Ou

(10) Patent No.: US 8,553,569 B2
(45) Date of Patent: Oct. 8, 2013

(54) METHOD OF CONNECTION RE-ESTABLISHMENT AND RELATED COMMUNICATION DEVICE

(75) Inventor: Meng-Hui Ou, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 344 days.

(21) Appl. No.: 12/429,180

(22) Filed: Apr. 23, 2009

(65) Prior Publication Data

US 2009/0285111 A1 Nov. 19, 2009

Related U.S. Application Data

(60) Provisional application No. 61/054,466, filed on May 19, 2008.

(51) Int. Cl.
*H04J 3/14* (2006.01)

(52) U.S. Cl.
USPC .......................................... 370/248

(58) Field of Classification Search
USPC .................................. 370/241–251
See application file for complete search history.

(56) References Cited

U.S. PATENT DOCUMENTS

| 7,561,561 | B2 * | 7/2009 | Wu ............................... | 370/350 |
| 7,706,410 | B2 | 4/2010 | Chun | |
| 7,733,826 | B2 * | 6/2010 | Jiang ............................. | 370/328 |
| 2003/0206534 | A1 * | 11/2003 | Wu ............................... | 370/328 |
| 2004/0185855 | A1 * | 9/2004 | Storm et al. .................. | 455/445 |
| 2004/0203623 | A1 * | 10/2004 | Wu .............................. | 455/412.1 |
| 2004/0203778 | A1 * | 10/2004 | Kuo et al. ..................... | 455/436 |
| 2005/0036477 | A1 * | 2/2005 | Jiang ............................. | 370/350 |
| 2005/0255870 | A1 * | 11/2005 | Chang et al. .................. | 455/502 |
| 2006/0067238 | A1 * | 3/2006 | Olsson et al. ................. | 370/242 |
| 2006/0223537 | A1 * | 10/2006 | Kojima ......................... | 455/436 |
| 2006/0281413 | A1 * | 12/2006 | Burbidge et al. ......... | 455/67.11 |
| 2007/0064599 | A1 * | 3/2007 | Jiang ............................. | 370/229 |
| 2007/0064602 | A1 * | 3/2007 | Jiang ............................. | 370/229 |
| 2007/0091895 | A1 * | 4/2007 | Wu .............................. | 370/394 |
| 2007/0104109 | A1 * | 5/2007 | Jiang ............................. | 370/244 |
| 2007/0195733 | A1 * | 8/2007 | Noh .............................. | 370/331 |
| 2007/0258489 | A1 * | 11/2007 | Jiang ............................. | 370/479 |
| 2008/0008212 | A1 * | 1/2008 | Wang et al. ................... | 370/503 |

(Continued)

FOREIGN PATENT DOCUMENTS

| EP | 1 465 369 A1 | 10/2004 |
| EP | 1 777 857 A2 | 4/2007 |

(Continued)

OTHER PUBLICATIONS

Somasundaram, Shankar, RRC Procedures for RLC Reset', Jan. 4, 2008, U.S. Appl. No. 61/019,049.*

(Continued)

*Primary Examiner* — Kwang B Yao
*Assistant Examiner* — Juvena Loo
(74) *Attorney, Agent, or Firm* — Blue Capital Law Firm, P.C.

(57) ABSTRACT

A method of connection re-establishment for a user equipment (UE) in a wireless communication system includes starting a radio link monitoring timer or a radio link monitoring counter, and stopping the radio link monitoring timer or the radio link monitoring counter if it is still running when a radio resource control (RRC) connection re-establishment procedure is triggered.

12 Claims, 4 Drawing Sheets

(56) References Cited

U.S. PATENT DOCUMENTS

| | | | |
|---|---|---|---|
| 2008/0056148 A1* | 3/2008 | Wu | 370/252 |
| 2009/0088195 A1 | 4/2009 | Rosa | |
| 2009/0163211 A1 | 6/2009 | Kitazoe | |
| 2009/0175163 A1* | 7/2009 | Sammour et al. | 370/216 |
| 2009/0175175 A1* | 7/2009 | Somasundaram et al. | 370/242 |
| 2009/0190480 A1* | 7/2009 | Sammour et al. | 370/242 |
| 2010/0111206 A1 | 5/2010 | Wu | |
| 2010/0195614 A1 | 8/2010 | Nimbalker | |
| 2010/0238875 A1 | 9/2010 | Sung | |
| 2011/0080825 A1* | 4/2011 | Dimou et al. | 370/216 |

FOREIGN PATENT DOCUMENTS

| | | |
|---|---|---|
| EP | 1 852 995 A2 | 11/2007 |
| JP | 2007267409 A | 10/2007 |
| KR | 1020040015672 A | 2/2004 |
| KR | 1020070033296 A | 3/2007 |
| WO | 2006067570 A1 | 6/2006 |
| WO | 2007147431 A1 | 12/2007 |

OTHER PUBLICATIONS

3GPP TSG-RAN2#64 meeting, Miscellaneous corrections and clarifications, Nov. 10, 2008.
3GPP, R2-083xxx Draft CRr3 to 36331-820 on Miscellaneous corrections and clarifications.doc, Jun. 30, 2008.
"3GPP TS 36.321 V8.1.0, 3rd Generation Partnership Project; Technical Specification Group Radio Access Network; Evolved Universal Terrestrial Radio Access (E-UTRA) Medium Access Control (MAC) protocol specification (Release 8)", Mar. 1, 2008, XP002521730.
Nokia Corporation, Nokia Siemens Networks: "Criteria for Short and Long BSR", 3GPP TSG-RAN WG2 Meeting #60bis, R2-080015, XP050137919, Jan. 14-18, 2008, Sevilla, Spain.
3GPP TSG-RAN WG2 Meeting #60bis. Sevilla, Spain, Jan. 14-18, 2008, R2-080015.
3GPP TS 36.321 BV8.0.0 (Dec. 2007).
Email of Wed, May 14, 2008 entitled scheduled email discussions after RAN2 #62 sent by Joern Krause.
3GPP TSG-RAN WG2 #62, May 5-9, 2008, Kansas City, UDS, R2-082259.
Email of Tue, Apr. 29, 2008 entitled RAN2#62 LG contributions batch1 uploaded sent by SungHoon Jung.
3GPP TDocs (written contributions) at meeting, Meeting R-62, May 5, 2008 to May 9, 2008, Kansas City.
GPP TSG-RAN WG2 Meeting #63, jeju. Korea, Aug. 18-22, 2008, Contribution R2-083835.
Email of Fri, Jun. 20, 2008 from Benoist Sebire en tied 62_LTE_C07 MAC Padding BSR inclusion to complete the MAC PDU.
Email of Sat, Jun. 21, 2008 from Benoist Sebire entitled 62_LTE_C07 MAC Padding BSR inclusion to complete the MAC PDU.
3GPP TSG-RAN WG2 #61bis, Mar. 31-Apr. 4, 2008, Shenzhen, China, document R2-081801.
3GPP TSG RAN WG2 #61. Feb. 11-15, 2008, Sorrento, Italy, document R2-080925.
Communication of a notice of opposition on related EP Patent Application No. 09005422.2 issued on May 24, 2011.
3GPP TS 36,321 V8.1,0 (Mar. 2008).
E-UTRA Radio resource Contro (RRC); Protocol specifiation (Release 8), 3GPP TS 36.331 v8,1.0 (Mar. 2008), p. 33-38, 116, 117.
Office Action on corresponding foreign application (JP 2009-073452) from JPO dated Jul. 5, 2011.
Office Action on corresponding foreign application (JP 2009-113081) from JPO dated Aug. 30, 2011.
Notice of Allowance of related KR Patent Application No. 10-2009-0028586 issued on Feb. 24, 2011.

* cited by examiner

METHOD OF CONNECTION RE-ESTABLISHMENT AND RELATED COMMUNICATION DEVICE

CROSS REFERENCE TO RELATED APPLICATIONS

This application claims the benefit of U.S. Provisional Application No. 61/054,466, filed on May 19, 2008 and entitled "Method and Apparatus for Improving Signalling Utilization", the contents of which are incorporated herein by reference.

BACKGROUND OF THE INVENTION

1. Field of the Invention

The present invention relates to a method of connection re-establishment and related communication device, and more particularly, to a method of connection re-establishment and related communication device for avoiding repeatedly triggering connection re-establishment procedure in a wireless communication system.

2. Description of the Prior Art

Long Term Evolution wireless communications system (LTE system) is an advanced high-speed wireless communications system established upon the 3G mobile telecommunications system, that supports only packet-switched transmission, and tends to implement both Medium Access Control (MAC) layer and Radio Link Control (RLC) layer in one single communication site, such as in Node B alone rather than in Node B and RNC (Radio Network Controller) respectively, meaning the system structure becomes simple.

In the LTE system, the Radio Resource Control (RRC) layer, a Layer 3 protocol, is the core of communications protocols related to access stratum (AS) and is located in evolved Node B (eNB) of the Evolved UMTS Terrestrial Radio Access Network (E-UTRAN) and a user equipment (UE). The RRC layer uses RRC messages to perform RRC procedures. RRC messages are formed from many information elements (IEs) used for embedding necessary information for setting, changing, or releasing protocol entities of Layer 2 and Layer 1, thereby establishing, adjusting, or canceling information exchange channels to perform data packet transportation.

Generally speaking, when the UE has established the connection with the network, the connection may encounter some problems under certain circumstances. At this point, the UE attempts to recover the connection with the network through an RRC connection re-establishment procedure. Thus, when the connection between the UE and the network does not work functionally, the LTE system defines the following situations which can trigger an RRC connection re-establishment procedure.

(1) When radio link failure occurs, the UE re-establishes the connection with the network through the RRC connection re-establishment procedure.

(2) When handover failure occurs, the UE attempts to re-establish the connection with the network.

In addition, when the UE detects a physical layer radio link problem, the RRC layer starts a timer. If the physical layer radio link problem still exists when the timer expires, the RRC layer determines the radio link failure occurs. Generally, there are two other situations where the RRC layer determines the radio link failure occurs: (1) The MAC layer informs the RRC layer that random access problem occurs; (2) The RLC layer informs the RRC layer that a lower layer problem is detected. The lower layer problem is caused by the number of retransmission attempts of one RLC protocol data unit (PDU) exceeding a predefined value. As a result, the UE initiates the RRC connection re-establishment procedure.

Nevertheless, when the radio link problems are detected by the physical layer, the RRC layer starts the timer to perform radio link monitoring. In the meantime, the UE may not be able to successfully transmit RLC PDUs due to the radio link problem, causing the number of retransmission attempts to exceed the predefined value. Consequently, the RRC layer determines the radio link failure occurs and initiates the RRC connection re-establishment procedure. Once the timer expires, another RRC connection re-establishment procedure is triggered. As a result, the previous RRC connection re-establishment procedure may be aborted or an unexpected problem may occur.

To put it simply, the lower layer problem is detected prior to expiry of the timer, which triggers an RRC connection re-establishment procedure. Another RRC connection re-establishment is triggered when the timer expires. As a result, unexpected problem may occur, causing the connection malfunction.

SUMMARY OF THE INVENTION

The present invention discloses a method of connection re-establishment for a UE in a wireless communication system. The method includes starting a radio link monitoring timer or a radio link monitoring counter and stopping the radio link monitoring timer or the radio link monitoring counter when an RRC connection re-establishment procedure is triggered and the radio link monitoring timer or the radio link monitoring counter is running and does not expire.

The present invention further discloses a communication device of a UE in a wireless communication system for connection re-establishment. The communication device includes a processor and a storage device. The processor is used for executing a process. The storage device is coupled to the processor, and used for storing a program for executing the process. The process includes starting a radio link monitoring timer or a radio link monitoring counter and stopping the radio link monitoring timer or the radio link monitoring counter when an RRC connection re-establishment procedure is triggered and the radio link monitoring timer or the radio link monitoring counter is running and does not expire.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
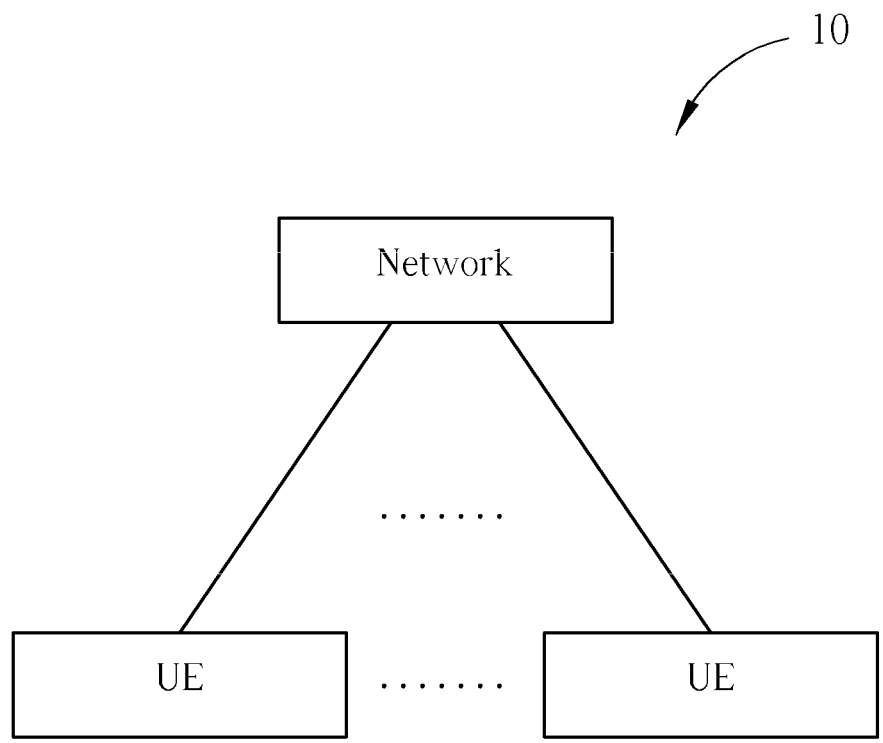
FIG. 1 is a schematic diagram of a wireless communication system.

Please refer to FIG. 1, which is a schematic diagram of a wireless communications system 10. The wireless communications system 10 is preferably a Long Term Evolution (LTE) communications system, and is briefly formed with a network terminal and a plurality of user equipments. In FIG. 1, the network terminal and the user equipments are simply utilized for illustrating the structure of the wireless communications system 10. Practically, the network terminal may include a plurality of evolved Node Bs (eNBs), an evolved UMTS radio access network (E-UTRAN) etc. According to actual demands, and the user equipments (UEs) can be apparatuses such as mobile phones, computer systems, etc.

Figure 2:
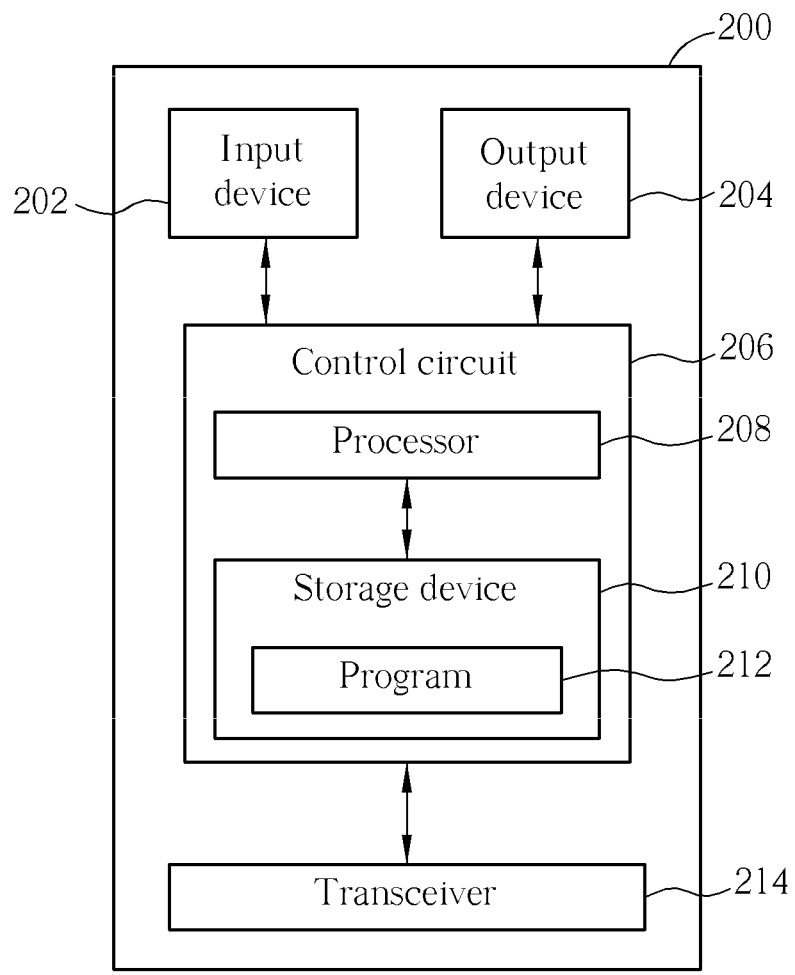
FIG. 2 is a functional block diagram of a wireless communication device.

Please refer to FIG. 2, which is a functional block diagram of a communications device 200. The communications device 200 can be utilized for realizing the UEs in FIG. 1. For the sake of brevity, FIG. 2 only shows an input device 202, an output device 204, a control circuit 206, a processor 208, a storage device 210, a program 212, and a transceiver 214 of the communications device 200. In the communications device 200, the control circuit 206 executes the program 212 in the storage device 210 through the processor 208, thereby controlling an operation of the communications device 200. The communications device 200 can receive signals input by a user through the input device 202, such as a keyboard, and can output images and sounds through the output device 204, such as a monitor or speakers. The transceiver 214 is used to receive and transmit wireless signals, deliver received signals to the control circuit 206, and output signals generated by the control circuit 206 wirelessly. From a perspective of a communications protocol framework, the transceiver 214 can be seen as a portion of Layer 1, and the control circuit 206 can be utilized to realize functions of Layer 2 and Layer 3.

Figure 3:
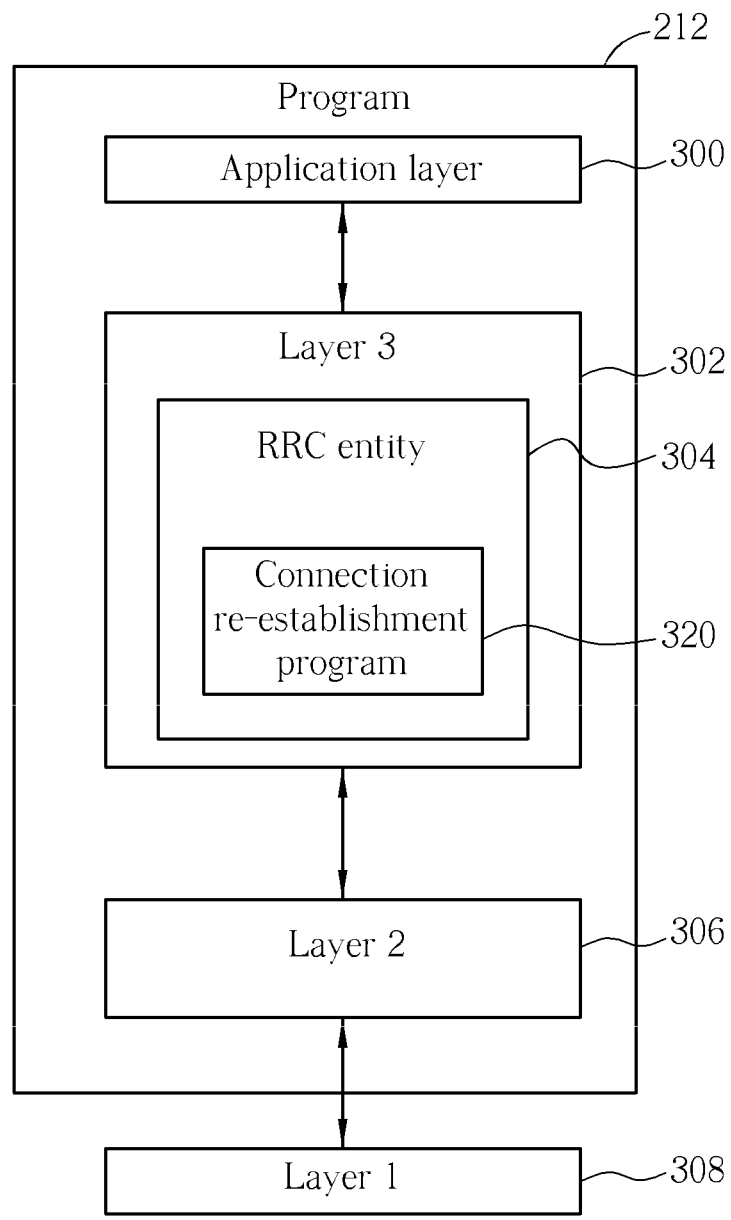
FIG. 3 is a schematic diagram of the program shown in FIG. 2.

Please refer to FIG. 3, which is a diagram of the program 212 shown in FIG. 2. The program 212 includes an application layer 300, a Layer 3 302, and a Layer 2 306, and is coupled to a Layer 1 308. The Layer 1 308 is utilized for realizing physical connections. The Layer 2 306 is utilized for realizing radio link control and medium access control. The Layer 3 302 is utilized for realizing radio resource control, and includes an RRC entity 304, which is used for controlling the Layer 1 218 and the Layer 2 206 and performing peer-to-peer RRC communication with other communications devices, such as a base station or a Node-B. When the communication device 200 has established connection with the network, the RRC entity 304 attempts to recover the connection with the network through the RRC connection re-establishment procedure if some connection problem is detected. In this situation, according to an embodiment of the present invention, a connection re-establishment program 320 is provided to assure that the RRC connection re-establishment procedure works well.

Figure 4:
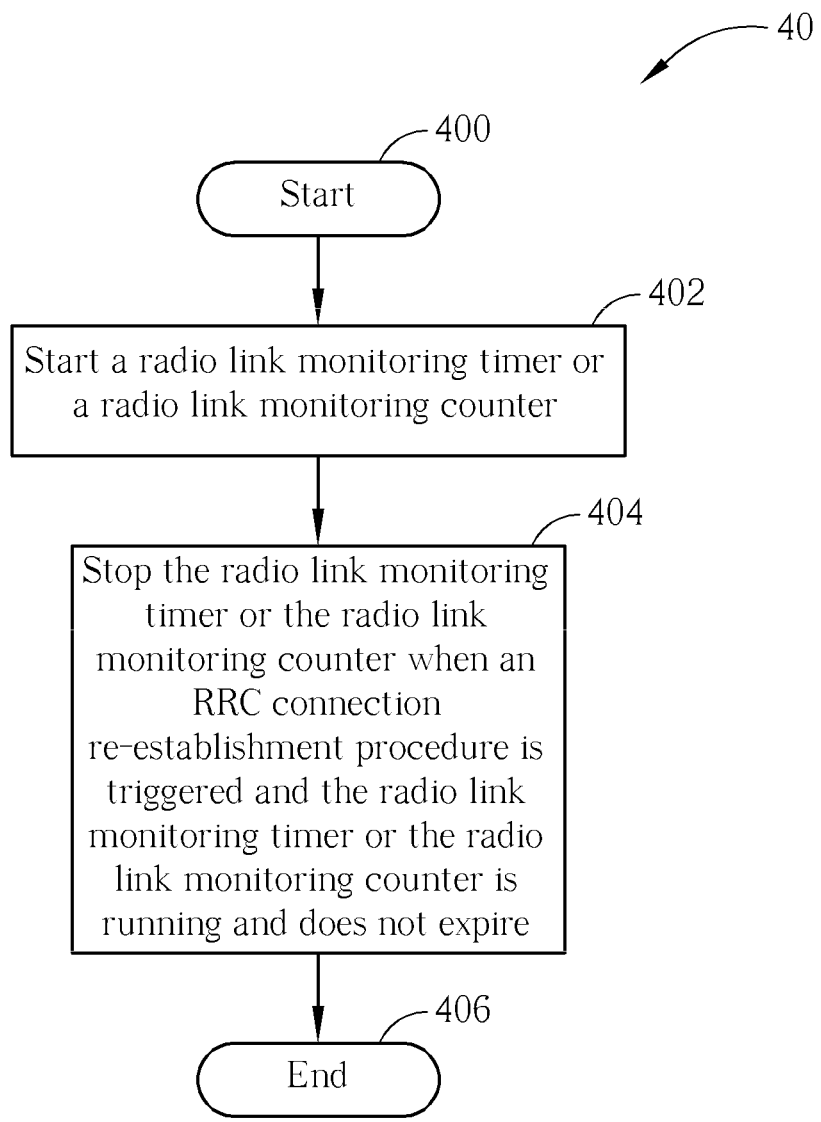
FIG. 4 is a flowchart of a process according to an embodiment of the present invention.

Please refer to FIG. 4, which is a flowchart of a process 40 according to an embodiment of the present invention. The process 40 is used for connection re-establishment for a UE in a wireless communication system to avoid the connection malfunction caused by the RRC connection re-establishment procedure being repeatedly triggered. The process 40 can be compiled into the connection re-establishment program 320. The process 40 includes the following steps:

Step 400: Start.

Step 402: Start a radio link monitoring timer or a radio link monitoring counter.

Step 404: Stop the radio link monitoring timer or the radio link monitoring counter when an RRC connection re-establishment procedure is triggered and the radio link monitoring timer or the radio link monitoring counter is running and does not expire.

Step 406: End.

According to the process 40, when the RRC connection re-establishment procedure is triggered and the radio link monitoring timer or the radio link monitoring counter is still running and does not expire, an embodiment of the present invention stops the radio link monitoring timer or the radio link monitoring counter. Preferably, the radio link monitoring timer is a timer T310. The radio link monitoring counter is used for counting the number of detections of the radio link problem. As a result, the connection malfunction, for example, the previous RRC connection re-establishment procedure may be aborted and double-initiating of the RRC connection re-establishment procedure due to expiry of the radio link monitoring timer can be avoided.

Preferably, the RRC connection re-establishment procedure is triggered by a lower layer problem. The lower layer problem could be that the number of retransmission attempts of one RLC PDU exceeds the predefined value. Therefore, when the number of retransmission attempts of one RLC PDU exceeds the predefined value, and the radio link monitoring timer does not expire, according to an embodiment of the present invention, the UE stops the radio link monitoring timer or the radio link monitoring counter to avoid double-initiating the RRC connection re-establishment procedure due to expiry of the radio link monitoring timer.

To sum up, according to an embodiment of the present invention, when the RRC connection re-establishment procedure is triggered and the radio link monitoring timer or the radio link monitoring counter is running and does not expire, the UE stops the radio link monitoring timer or the radio link monitoring counter to avoid the connection malfunction caused by double-initiating the RRC connection re-establishment procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of connection re-establishment for a user equipment in a wireless communication system, the method comprising:
   starting a radio link monitoring timer or a radio link monitoring counter to monitor radio link problems; and
   voiding a potential of double-initiating a radio resource control (RRC) connection re-establishment procedure by stopping the radio link monitoring timer or the radio link monitoring counter when the RRC connection re-establishment procedure is triggered and the radio link monitoring timer or the radio link monitoring counter is running and does not expire.

2. The method of claim 1, wherein the RRC connection re-establishment procedure is triggered by a lower layer problem.

3. The method of claim 2, wherein the lower layer problem is that the number of retransmission attempts of a Radio Link Control Protocol Data Unit (RLC PDU) exceeds a predefined value.

4. The method of claim 1, wherein the radio link monitoring timer is a timer T310.

5. The method of claim 1, wherein the radio link monitoring counter is used for counting the number of detections of a radio link problem.

6. The method of claim 1 further comprises resetting the radio link monitoring counter.

7. A communication device of a user equipment in a wireless communication system for connection re-establishment, the communication device comprising:
   a processor for executing a process; and a storage device, coupled to the processor, for storing a program for executing the process, wherein the process comprises:
  starting a radio link monitoring timer or a radio link, monitoring counter to monitor radio link problems; and
  avoiding a potential of double-initiating a radio resource control (RRC) connection re-establishment procedure by stopping the radio link monitoring timer or the radio link monitoring counter when the RRC connection re-establishment procedure is triggered and the radio link monitoring timer or the radio link monitoring counter is running and does not expire.

8. The communication device of claim 7, wherein the RRC connection re-establishment procedure is triggered by a lower layer problem.

9. The communication device of claim 8, wherein the lower layer problem is that the number of retransmission attempts of a Radio Link Control Protocol Data Unit (RLC PDU) exceeds a predefined value.

10. The communication device of claim 7, wherein the radio link monitoring timer is a timer T310.

11. The communication device of claim 7, wherein the radio link monitoring counter is used for counting the number of detections of a radio link problem.

12. The communication device of claim 7, wherein the process further comprises resetting the radio link monitoring counter.

* * * * *